(12) United States Patent
Yamakawa

(10) Patent No.: US 11,796,965 B2
(45) Date of Patent: Oct. 24, 2023

(54) DISPLAY APPARATUS AND WATCH

(71) Applicant: CASIO COMPUTER CO., LTD., Tokyo (JP)

(72) Inventor: Eiji Yamakawa, Tama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 344 days.

(21) Appl. No.: 17/179,530

(22) Filed: Feb. 19, 2021

(65) Prior Publication Data

US 2021/0263475 A1 Aug. 26, 2021

(30) Foreign Application Priority Data

Feb. 25, 2020 (JP) ................................. 2020-028959
Sep. 24, 2020 (JP) ................................. 2020-159197

(51) Int. Cl.
*G04C 10/02* (2006.01)
*H02S 40/22* (2014.01)
(Continued)

(52) U.S. Cl.
CPC ............. *G04C 10/02* (2013.01); *G04G 17/04* (2013.01); *H02S 40/22* (2014.12); *G04B 37/08* (2013.01)

(58) Field of Classification Search
CPC ...... G04C 10/02; G04G 17/04; G04G 17/045; H02S 40/22; G04B 37/08; Y02E 10/52
See application file for complete search history.

(56) References Cited

U.S. PATENT DOCUMENTS

| 6,094,404 A | * | 7/2000 | Hidai | ..................... G04C 10/02 |
| | | | | 368/205 |
| 9,823,625 B2 | * | 11/2017 | Abe | ..................... G04C 10/02 |
| 2019/0271953 A1 | | 9/2019 | Hidai et al. | |

FOREIGN PATENT DOCUMENTS

| CN | 109841644 A | 6/2019 |
| GB | 2 0111 31 A | 7/1979 |

(Continued)

OTHER PUBLICATIONS

Notice of Reasons for Refusal dated Mar. 1, 2022 received in Japanese Patent Application No. JP 2020-159197 together with an English language translation.

(Continued)

*Primary Examiner* — Edwin A. Leon
(74) *Attorney, Agent, or Firm* — SCULLY SCOTT MURPHY & PRESSER, PC

(57) ABSTRACT

A display apparatus includes the following. A protecting plate is formed of a material which transmits light. A light transmitting plate is positioned below the protecting plate and is positioned in contact with the protecting plate. A display is provided below the light transmitting plate and includes a display region which can be viewed from outside. An air layer is positioned between the light transmitting plate and the display. A light reflection prevention layer is provided on at least one of a surface of the light transmitting plate facing the air layer and a surface of the display facing the air layer. The protecting plate, the light transmitting plate, the display, the air layer, and the light reflection prevention layer are layered in a thickness direction of the protecting plate. A region in the protecting plate overlapped with the display region of the display includes a window with which waterproof inspection is performed.

20 Claims, 7 Drawing Sheets

(51) Int. Cl.
*G04G 17/04* (2006.01)
*G04B 37/08* (2006.01)

(56) References Cited

FOREIGN PATENT DOCUMENTS

| | | |
|---|---|---|
| JP | S55-59487 A | 5/1980 |
| JP | S60-94850 U1 | 6/1985 |
| JP | H07-141086 A | 6/1995 |
| JP | 2001-305249 A | 10/2001 |
| JP | 2008-033018 A | 2/2008 |
| JP | 2008-102459 A | 5/2008 |
| JP | 4215402 B2 | 1/2009 |
| JP | 2011-138152 A | 7/2011 |
| JP | 2011-252934 A | 12/2011 |
| JP | 6075467 B2 | 2/2017 |
| JP | 2018-044869 A | 3/2018 |
| JP | 2018-105632 A | 7/2018 |

OTHER PUBLICATIONS

Extended European Search Report dated Jul. 2, 2021 received in European Patent Application No. 21157756.4.

\* cited by examiner

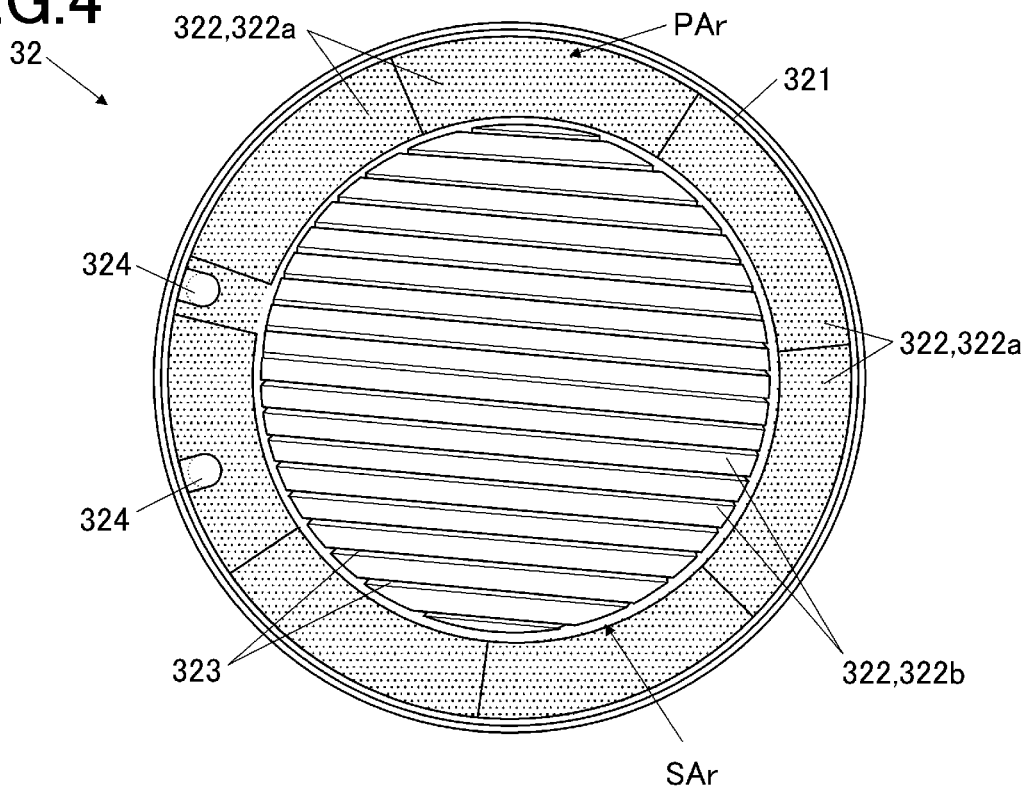
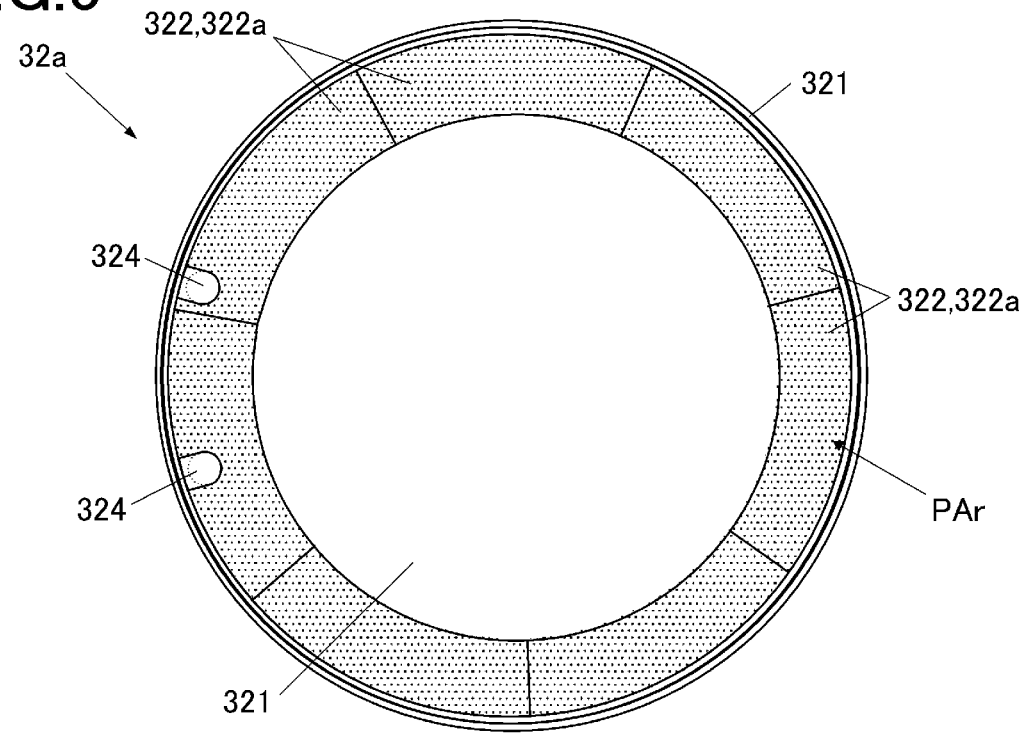

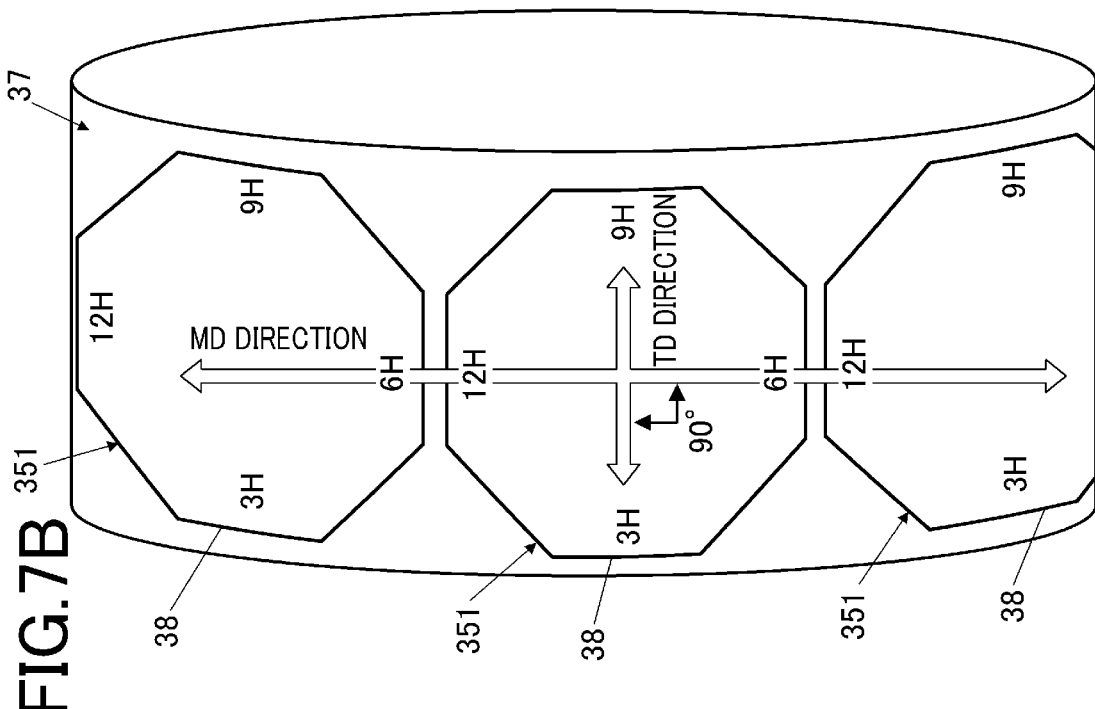
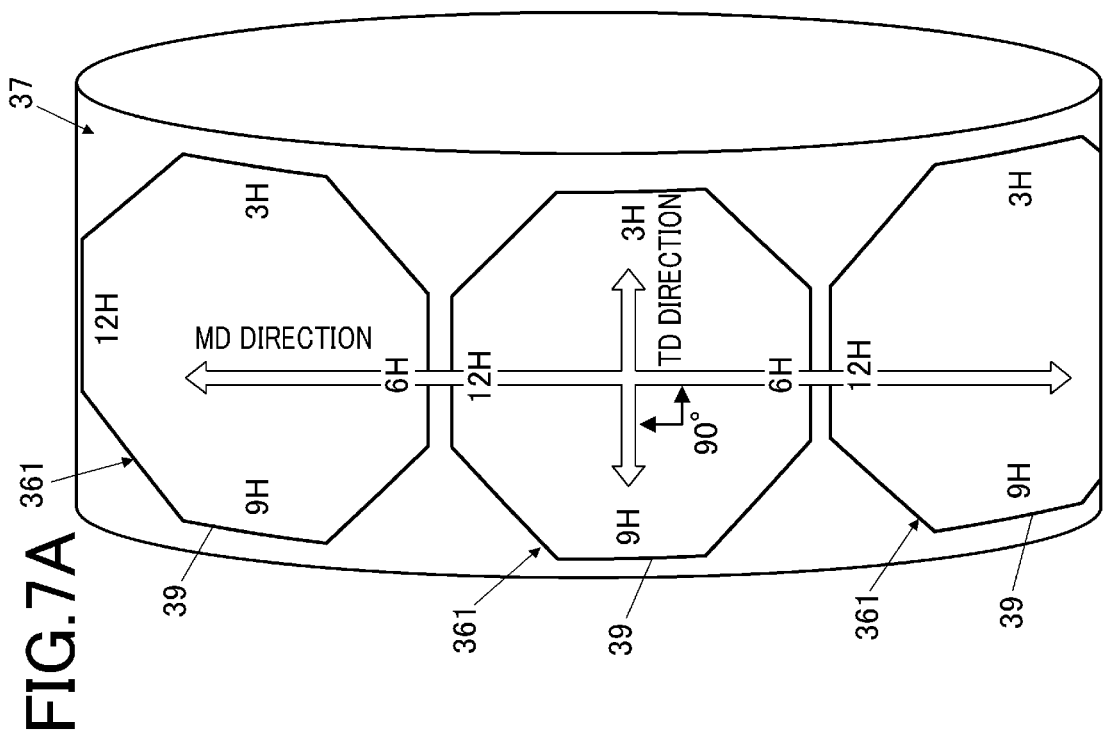

DISPLAY APPARATUS AND WATCH

CROSS-REFERENCE TO RELATED APPLICATION

This application is based upon and claims the benefit of priority from the prior Japanese Patent Application No. 2020-028959, filed on Feb. 25, 2020, and Japanese Patent Application No. 2020-159197, filed on Sep. 24, 2020, the entire contents of which are incorporated herein by reference.

BACKGROUND

1. Field of the Invention

The present disclosure relates to a display apparatus and a watch.

2. Description of the Related Art

Conventionally, there is a well-known device provided with a display apparatus, such devices including a waterproof watch.

In such display apparatus (or a device provided with such display apparatus), a waterproof inspection is performed to test before shipping whether waterproof properties are secured.

In such waterproof inspection, after the device is submerged, a drastic change in temperature is applied to the air inside the case and the air is condensed. Then, it is observed to see whether fogging by condensation occurs in a protecting member formed by glass, etc. (windshield member in watch). If the fogging due to the condensation occurs in the protecting member, this means that the water entered the case when the device was submerged. Therefore, it is determined that the waterproof properties are not satisfactory. If the fogging does not occur, it is determined that satisfactory waterproof properties are secured, and then the reliability of the waterproof properties is confirmed.

In order to perform such waterproof inspection, it is necessary to provide an air layer in the apparatus. However, if the air layer is provided in a region overlapped with a display region of a display member such as a liquid crystal panel, visibility of the display of the display member may worsen due to reflection of light at a boundary with the air layer.

For example, JP 2018-44869 proposes providing an air layer on a back surface side of a circumferential edge of the protecting member in a region which does not overlap with the display region of the display member. When the waterproof inspection is performed, it is observed to see whether fogging occurs in the protecting member due to the condensation occurring in the air layer. With this, it is determined whether the waterproof properties are secured.

SUMMARY

According to one aspect of the present invention, a display apparatus including: a protecting plate which is formed of a material which transmits light; a light transmitting plate which is positioned below the protecting plate and which is positioned in contact with the protecting plate; a display which is provided below the light transmitting plate and which includes a display region which can be viewed from outside; an air layer which is positioned between the light transmitting plate and the display; and a light reflection prevention layer which is provided on at least one of a surface of the light transmitting plate facing the air layer and a surface of the display facing the air layer, wherein, the protecting plate, the light transmitting plate, the display, the air layer, and the light reflection prevention layer are layered in a thickness direction of the protecting plate, and a region in the protecting plate overlapped with the display region of the display includes a window with which waterproof inspection is performed.

According to another aspect of the present invention, a display apparatus including, a protecting plate which is formed of a material which transmits light; a light transmitting plate which is positioned below the protecting plate; a display which is provided below the light transmitting plate, which is provided in contact with the light transmitting plate, and which includes a display region which can be viewed from outside; an air layer which is positioned between the protecting plate and the light transmitting plate; and a light reflection prevention layer which is provided on at least one of a surface of the protecting plate facing the air layer and a surface of the light transmitting plate facing the air layer, wherein, the protecting plate, the light transmitting plate, the display, the air layer, and the light reflection prevention layer are layered in a thickness direction of the protecting plate, and a region in the protecting plate overlapped with the display region of the display includes a window with which waterproof inspection is performed.

According to another aspect of the present invention, a watch includes, a display apparatus as described above, and a case member which stores the display apparatus.

BRIEF DESCRIPTION OF THE DRAWINGS

FIG. 4 is a plane view showing a solar panel according to the present embodiment.

FIG. 5 is a plane view showing a modification of the solar panel according to the present embodiment.

FIG. 7A is a schematic diagram showing an example of an arrangement of a die when a base material included in the light reflection prevention layer is cut out from a rolled sheet according to the present embodiment for the base material of the light reflection prevention layer positioned on the liquid crystal display side.

FIG. 7B is a schematic diagram showing an example of an arrangement of a die when a base material included in the light reflection prevention layer is cut out from a rolled sheet according to the present embodiment for the base material of the light reflection prevention layer positioned on the solar panel side.

DETAILED DESCRIPTION OF THE PREFERRED EMBODIMENTS

Embodiments of a display apparatus and a watch including the display apparatus are described with reference to FIG. 1 to FIG. 7.

Various preferable technical limitations to implement the present invention are added to the embodiments described below but the scope of the present invention is not limited by the embodiments and the illustrated examples described below.

Figure 1:
FIG. 1 is a front view of a watch according to the present embodiment.

FIG. 1 is a front view showing a watch according to the present embodiment.

As shown in FIG. 1, a watch 100 according to the present embodiment includes a case member (hereinafter referred to as "watch case 1" of the present embodiment). The watch case 1 is formed from a hard synthetic resin such as engineering plastic or super engineering plastic, or a hard material such as metal including titanium, stainless steel (SUS), etc., ceramics, or the like. The material used to form the watch case 1 is not limited to the examples described above.

The watch case 1 according to the present embodiment is formed to be a hollow short column shape open at the top and the bottom in a case thickness direction (front and back of a watch).

An exterior member 12 such as a bezel is provided to surround an opening portion on a front side of the watch case 1 (viewed side, upper side of the watch). The shape of the exterior member 12 is not limited to the illustrated example. The exterior member 12 does not have to be provided, and the configuration may not be provided with the exterior member 12.

A windshield member 31 (protecting plate) as a protecting member included in a later-described display apparatus 3 is provided in the opening on the front side of the watch case 1 to close the opening portion.

A back lid (not shown) is attached to the back side of the watch case 1 to close the opening portion.

According to the present embodiment, the windshield member 31 which closes the opening on the front side of the watch case 1 and the back lid which closes the opening on the back side are attached to the watch case 1 with a waterproof ring 121 (see FIG. 2) placed between the windshield member 31 and the watch case 1 and between the back lid and the watch case 1. With this, waterproof properties (airtightness) inside the watch case 1 are secured.

Band attaching portions 13 for attaching a watch band (not shown) are provided at the upper and lower edges of the watch case 1 as shown in FIG. 1, that is, the edge at the 12 o'clock direction side and the edge at the 6 o'clock direction side in the analog type watch.

The watch 100 includes an operation button 14 on a side of the watch case 1. According to the example shown in FIG. 1, a total of four press buttons, two on each of the left and right side of the watch case 1 are positioned as the operation buttons 14.

A display apparatus 3 and a module, etc. (not shown) (clock module including a timekeeping circuit which is a timekeeper to execute a timekeeping process) which is used to operate each unit in the display apparatus 3 are stored inside the watch case 1 according to the present embodiment.

Next, the display apparatus 3 according to the present embodiment is described with reference to FIG. 2.

Figure 2:
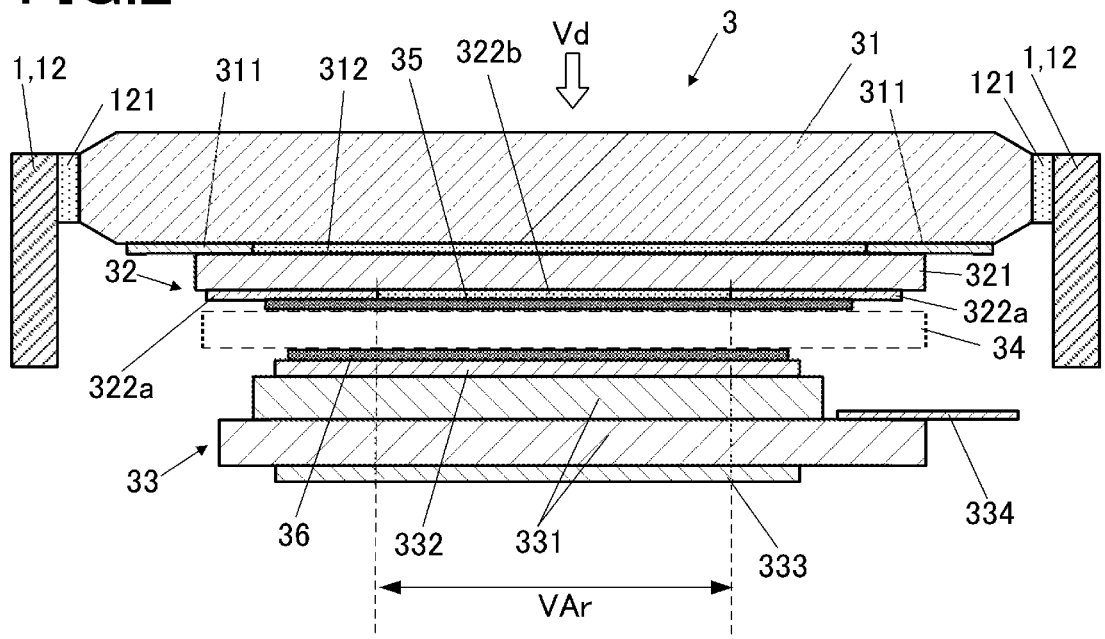
FIG. 2 is a schematic cross-sectional diagram showing a display apparatus according to the present embodiment.

FIG. 2 is a schematic cross-sectional diagram showing a configuration of main units in the display apparatus according to the present embodiment.

As shown in FIG. 2, the display apparatus 3 according to the present embodiment includes a windshield member 31 as a protecting member, a solar panel 32 positioned to be in contact with the lower portion of the windshield member 31, and a display member 33 provided below the solar panel 32.

A space is provided between the solar panel 32 and the display member 33, and this space portion is to be an air layer 34. The air layer 34 is not a sealed space, and is a space which communicates with the display apparatus 3 and the inside of the watch case 1 in which the display apparatus 3 is stored.

Light reflection prevention layers 35 and 36 are respectively provided on a surface in contact with (facing) the air layer 34 in the solar panel 32 (surface on the bottom side of the solar panel 32 in FIG. 2) and a surface in contact with (facing) the air layer 34 in the display member 33 (surface on the top side of the display member 33 in FIG. 2).

According to the present embodiment, the windshield member 31, the solar panel 32, the light reflection prevention layer 35, the air layer 34, the light reflection prevention layer 36, and the display member 33 are layered in a viewing direction Vd (direction from top to bottom in FIG. 2, shown with a white arrow in the drawing) (thickness direction of the protecting plate) viewing the display member 33 through the windshield member 31 and the solar panel 32.

The windshield member 31 is formed from a material through which light is transmitted, for example, a transparent glass. As described above, the windshield member 31 is attached to the watch case 1 with the waterproof ring (not shown) in between, and the opening on the front side of the watch case 1 is closed in a state in which airtightness is maintained in the watch case 1.

As shown in FIG. 2, according to the present embodiment, a decorated portion 311 (external regulator) is provided along the outer circumference on the back side (bottom side in FIG. 2) of the windshield member 31. The decorated portion 311 is a portion in which various numbers, letters, indexes and patterns are designed, and these are processed by various types of printing and vapor deposition processes.

The decorated portion 311 is positioned toward the viewed side than the display member 33 in the layered direction (viewing direction Vd). The decorated portion 311 may function as a shielding processed portion which is a viewing regulating portion to regulate viewing so that the region other than a display region Var (see FIG. 2) in the display member 33 cannot be viewed from outside.

The solar panel 32 (light transmitting plate) according to the present embodiment is a light transmitting type solar panel as described later and is a plate shaped light transmitting member. The solar panel 32 is attached to the back side of the windshield member 31 by an adhesive layer 312 including an optical adhesive (optical clear adhesive, OCA) which is an adhesive in a film shape.

The method to position the solar panel 32 on the back side of the windshield member 31 is not limited to the illustrated examples. A method other than adhesion can be used to provide the solar panel 32 as long as the solar panel 32 is positioned below the windshield member 31 as the protecting member without providing a layer of air between the windshield member 31, that is, without opening a space.

A mark for positioning which is not shown is attached to the solar panel 32, and positioning with the windshield member 31 is performed using an alignment device.

A power generating region 322 is provided in the solar panel 32 on the surface of the basic member 321. The power generating region 322 (see FIG. 2 and FIG. 4) functions as a solar cell which generates power by receiving light. The generated power obtained by performing photovoltaic generation using the solar panel 32 is accumulated in a secondary cell (not shown).

FIG. 4 is a plane view showing an example of a solar panel 32 according to the present embodiment. FIG. 4 is a schematic image. The positions of the lines dividing each block and the thickness and the number of the thin line power generators 322b as described later do not strictly represent the actual shape.

As shown in FIG. 4, in the solar panel 32 according to the present embodiment, a power generator 322 is formed on a base material 321. The power generator 322 includes a layered structure in which a transparent electrode, a semiconductor layer, and a back surface electrode are layered (all not shown).

The base material 321 is a thin plate shaped substrate including light transparency such as transparent plastic in a flexible film shape. The material which forms the base material 321 is not limited to the material illustrated here and for example, various transparent resin and glass can be applied.

In the power generator 322, an outer circumference power generator 322a in which a plurality of solar cells are divided into blocks along a circumference direction is provided on the outer circumference of the solar panel 32. The region in which the outer circumference power generator 322a is positioned is to be an outer circumference power generating region PAr. The entire outer circumference power generator 322a is to be the power generator 322, and light is hardly transmitted. According to the present embodiment, the outer circumference power generating region PAr in which the outer circumference generator 322a is formed is positioned to the viewing side than the display member 33 in the layering direction (viewing direction Vd). The outer circumference power generating region PAr may function as a shielding processed portion which is a viewing regulating portion to regulate viewing so that the region other than the display region Var (see FIG. 2) in the display member 33 cannot be viewed from outside.

A translucent power generating region SAr which transmits light is formed in the region overlapped on the display region VAr (see FIG. 2) of the display member 33, that is, the region on the inner side than the outer circumference power generating region PAr and the center portion in a surface direction of the solar panel 32.

The translucent power generating region SAr is a region in which a plurality of thin line power generators 322b which are power generators 322 in a thin line shape extending in a predetermined direction are aligned to be parallel in a direction orthogonal to an extending direction. In the translucent power generating region SAr, the thin line power generator 322b and a transparent region 323 through which light is transmitted are arranged alternately at a certain pitch.

It is not required to provide the translucent power generating region SAr.

When the solar panel 32 is a plate shaped light transmitting member, a power generating region (power generator 322) can be included in a portion other than the region overlapped with the display region VAr (see FIG. 2) of the display member 33 in the solar panel 32.

For example, in the example shown in FIG. 5, the outer circumference power generator 322a which does not transmit light is provided along a circumference direction in the outer circumference portion of the base material 321 formed with the material which transmits light. In this case also, the outer circumference power generating region PAR which is the region in which the outer circumference power generator 322a is positioned may function as a shielding processed portion which is a viewing regulating portion to regulate viewing so that the region other than the display region Var (see FIG. 2) in the display member 33 cannot be viewed from outside.

The power generator 322 is not formed in the region overlapped on the display region VAr (see FIG. 2) of the display member 33, that is, the region on the inner side than the outer circumference power generating region PAr and the center portion in the surface direction of the solar panel 32. The region is left as the base material 321 and is to be a region including light transparency. In this case, although the power generating amount slightly worsens, the solar panel 32 can be manufactured more easily compared to forming the translucent power generating region SAr.

The display member 33 (display) is a display including a flat display such as a liquid crystal display (LCD), an organic electroluminescence display or the like. The time and various information are displayed on the display member 33.

According to the present embodiment, the display member 33 includes a liquid crystal display (LCD) 331. The liquid crystal display 331 can be a reflecting liquid crystal display or can be a transparent liquid crystal display using a backlight.

For example, a MIP (memory in pixel) liquid crystal display employing a MIP technique can be suitably applied as the liquid crystal display 331. When the MIP liquid crystal display is employed, the SRAM is included in the pixels. Therefore, even if there is no input, a still image may be continuously displayed, and it is possible to make the consumption of power drastically lower. Therefore, this is preferable.

The screen which can be displayed by the liquid crystal display 331 is not limited, and a screen with a white background or a screen with a black background with the white and black inverted can be displayed, or the above can be displayed switching between each other. The display is not limited to a monochrome display and can be a color display.

An upper light polarizing plate 332 is positioned on the top side of the liquid crystal display 331 and a lower light polarizing plate 333 is positioned on the bottom side of the liquid crystal display 331, and the liquid crystal display 331 is placed between two light polarizing plates.

A wiring substrate 334 is connected to the liquid crystal display 331. When the MIP liquid crystal display is employed as the liquid crystal display 331, the wiring substrate 334 is provided corresponding to the MIP liquid crystal display.

As shown in FIG. 2, in the display member 33, the region near the center of the watch 100 in a radial direction is to be the display region VAr which can be viewed from outside (that is, the region other than the region in which viewing is regulated by the outer circumference power generating region PAr of the solar panel 32 functioning as the shielding processed portion). Various displays such as the display of the time is performed in the display region VAr.

The air layer 34 is necessary to perform a waterproof inspection in order to test whether waterproof properties of the display apparatus 3 and the watch 100 are secured.

That is, in the waterproof inspection, after the device is submerged, a drastic change of temperature is applied to the air inside the case to condense the air. Then, it is observed to see whether fogging due to condensation occurs in the windshield member 31 (protecting member). As described above, the air layer 34 is a space in communication with the display apparatus 3 and the inside of the watch case 1 in which the display apparatus 3 is stored. Therefore, if fogging occurs in the windshield member 31 due to the condensation occurring in the air layer 34, this means that water flowed inside the case when the watch 100 was submerged, and it is determined that the waterproof properties are not sufficient. If the fogging does not occur, it is determined that sufficient waterproof properties are secured.

The fogging due to condensation when the waterproof properties are not sufficient can be noticeably seen near the center of the display apparatus 3 (watch 100) in the radial direction. Therefore, according to the present embodiment, the region in the windshield member 31 (protecting member) overlapped with the display region VA of the display member 33 corresponding to near the center of the display apparatus 3 (watch 100) in the radial direction is used as a window for waterproof inspection. In the waterproof inspection, it is checked whether fogging due to condensation occurs near the center of the display apparatus 3 (watch 100) in the radial direction.

If the air layer 34 for the waterproof inspection is provided in the region overlapping with the display region VAr of the display member 33, light is reflected at the boundary between the air layer 34 due to the difference from the refraction index between the air layer 34 and the other layers. As a result, the light transmittance becomes worse, and the visibility of the display of the display member 33 becomes worse.

Figure 3:
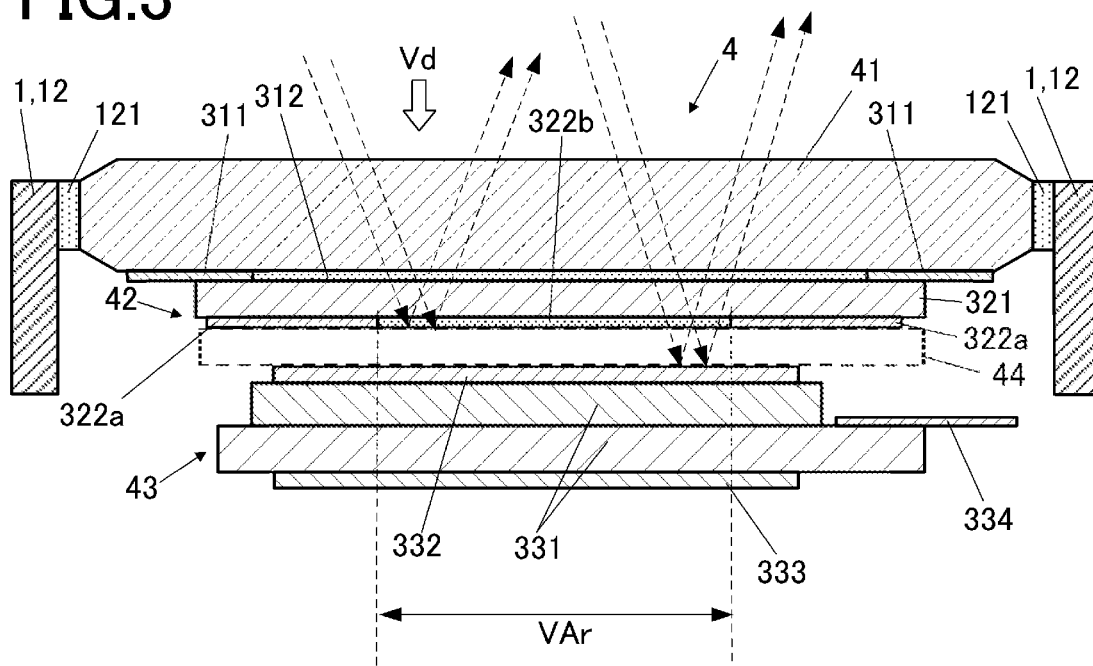
FIG. 3 is a schematic cross-sectional diagram showing light reflecting at a boundary between an air layer.

FIG. 3 is a schematic diagram showing the light reflecting at the boundary with the air layer when there is nothing provided between the air layer and the other layers. Light is shown with a broken line in the diagram. The members with the same reference numerals as in FIG. 2 are the same members and the description is omitted.

As shown in FIG. 3, in a display apparatus 4, when a windshield member 41, a solar panel 42, an air layer 44, and a display member 43 are layered in a viewing direction Vd viewing the display member 43 (direction from top to bottom in FIG. 3, shown with a white arrow in the diagram) (thickness direction of the protecting plate), the light entering from the viewing direction toward the display member 43 is reflected at a surface of the solar panel 42 in contact with the air layer 44 and the surface of the display member 43 in contact with the air layer 44. In this case, it becomes difficult to see the display screen of the display member 43.

According to the present embodiment, the light reflection prevention layers 35 and 36 are respectively provided on the surface of the solar panel 32 in contact with the air layer 34 and the surface of the display member 33 in contact with the air layer 34.

The light reflection prevention layers 35 and 36 are attached to the surface of the solar panel 32 in contact with the air layer 34 and the surface of the display member 33 in contact with the air layer 34 by an adhesive layer (not shown) including adhesive or an adhesive sheet, for example. The method of providing the light reflection prevention layers 35 and 36 on each surface is not limited.

Figure 6A:
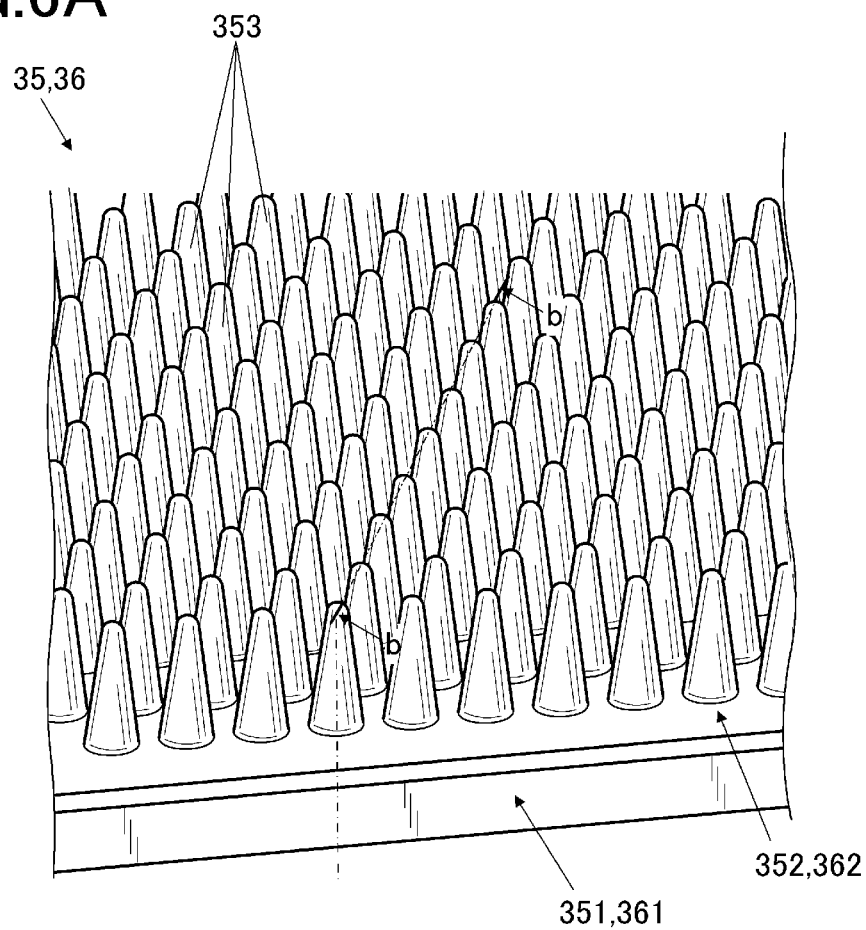
FIG. 6A is a perspective view showing an example of a configuration of a light reflection prevention layer according to the present embodiment.
Figure 6B:
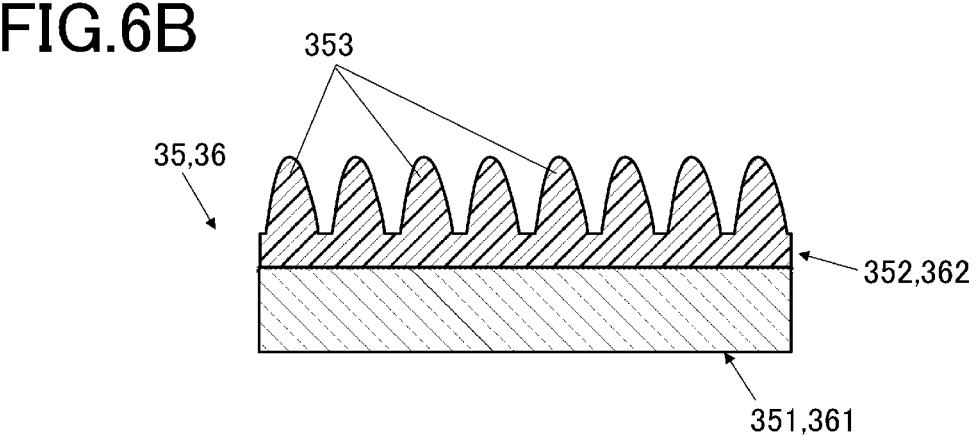
FIG. 6B is a cross-sectional view along line b-b shown in FIG. 6A.

FIG. 6A is a perspective view showing an example of a configuration of the light reflection prevention layer according to the present embodiment. FIG. 6B is a cross-sectional diagram along a line b-b shown in FIG. 6A.

As shown in FIG. 6A and FIG. 6B, according to the present embodiment, the light reflection prevention layers 35 and 36 include moth eye structures 352 and 362. The moth eye structures 352 and 362 are provided on the front surface of the base materials 351 and 361.

The moth eye structures 352 and 362 include a moth eye structure in which a plurality of small projections 353 are provided like a forest.

That is, the small projections 353 with a height of a few 100 nm are formed at a pitch of about 100 nm in the moth eye structures 352 and 362. The shape is a continuous bumpy shape. According to such structure, when light enters the moth eye structures 352 and 362, the refraction index is continuously changed and the reflection can be suppressed.

When the light reflection prevention layers 35 and 36 are provided in each surface in contact with the air layer 34 in the solar panel 32 and the surface in contact with the air layer 34 in the display member 33 as described in the present embodiment, preferably, the light reflection prevention layers 35 and 36 are positioned so that the arrangement pattern of the small projections 353 in the moth eye structure 352 in the light reflection prevention layer 35 positioned on the solar panel 32 side and the moth eye structure 362 in the light reflection prevention layer 36 positioned on the display member 33 side are aligned.

According to such positioning, concave-convex shapes in the moth eye structures 352 and 362 continue evenly and the reflection of light can be suppressed effectively.

According to the display apparatus 3 and the watch 100 including the above display apparatus 3, normally, the user views the display of the liquid crystal display 331 in a state with the watch 100 attached to the wrist. In this case, preferably, the display apparatus 3 is positioned in the watch case 1 so that the axis in the 12 o'clock-6 o'clock direction in an analog watch (that is, vertical direction shown in FIG. 1) and the arrangement of the small projections 353 in the moth eye structures 352 and 362 in the light reflection prevention layers 35 and 36 are aligned.

According to such positioning, the reflection of light can be suppressed effectively in the normal state of use.

By providing the moth eye structures 352 and 362 on the surface in contact with the air layer 34 in the solar panel 32 and the surface in contact with the air layer 34 in the display member 33, the reflection of light is suppressed, the reflection of the viewer, etc. reflecting on the display member 33 can be prevented, and the display of the display region VAr becomes easy to view.

Since the light transmittance becomes high, the screen of the liquid crystal display 331 becomes bright, and the display becomes clear and easy to view. Moreover, the contrast of the colors in the liquid crystal display 331 improves, and the display can be performed vividly, reliably reproducing the original color. When the display with the black portion being large such as the display of a black background is performed on the liquid crystal display 331, the black color is shown to be clearly blacker.

According to the present embodiment, the base materials 351 and 361 in which the moth eye structures 352 and 362 are provided include a phase difference film. According to the present embodiment, a high phase difference film is applied as the phase difference film. The phase difference film included in the base materials 351 and 361 is not limited to the high phase difference film.

The high phase difference film has a slow axis and a fast axis generated in the manufacturing process. The slow axis in the surface of the optical film is an axis in which the refractive index becomes maximum in the film surface and the degree of refraction of light can be adjusted depending on how the film is positioned.

FIG. 7A and FIG. 7B are schematic diagrams showing an example of positioning die when the base material included in the light reflection prevention layer according to the present embodiment is cut out from a rolled sheet. FIG. 7A shows the example of the base material of the light reflection prevention layer positioned on the liquid crystal display side and FIG. 7B shows the base material of the light reflection prevention layer positioned on the solar panel side.

As shown in FIG. 7A and FIG. 7B, the high phase difference film used as the base materials 351 and 361 are cut out by dies 38 and 39 from the rolled base material sheet 37. The base material sheet 37 is normally generated extending in an extending direction (machine direction referred to as a MD direction in FIG. 7A and FIG. 7B) along the circumferential direction of the roll. The direction orthogonal to the MD direction is shown as a TD direction (Transverse Direction) in FIG. 7A and FIG. 7B.

The present embodiment is an embodiment assuming that the slow axis appears in the TD direction. However, the direction in which the slow axis and the fast axis appears on the film surface depends on the manufacturing process and manufacturing method of the film and the material used in the base materials 351 and 361. Therefore, the high phase difference film applied as the base materials 351 and 361 of the light reflection prevention layers 35 and 36 is not limited to the high phase difference film in which the late axis appears in the TD direction.

Here, the relation between the watch 100 and the positions of the display member 33 and the light reflection prevention layers 35 and 36 is described with reference to FIG. 8.

Figure 8:
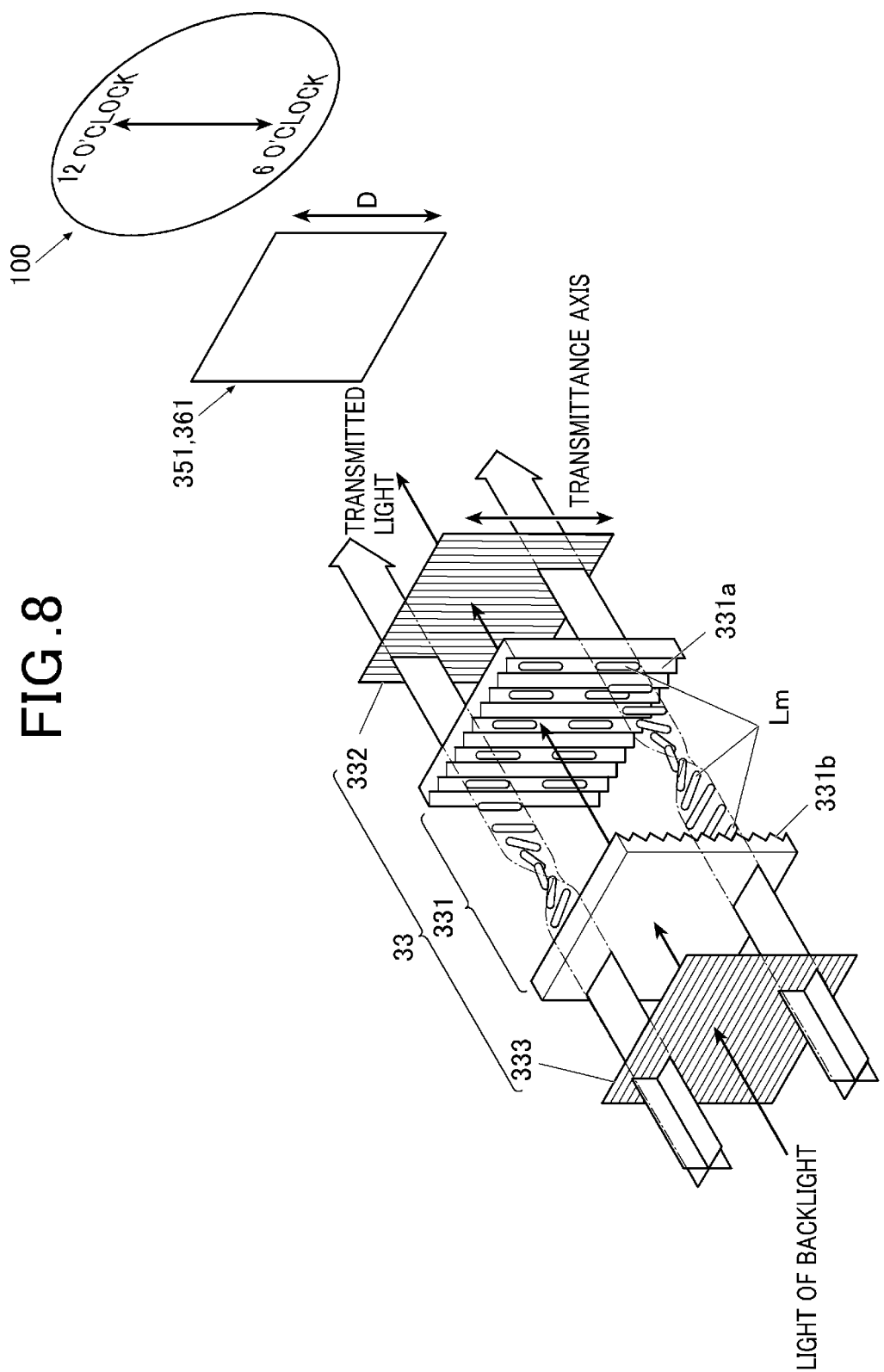
FIG. 8 is a descriptive diagram schematically showing the relation of the positions of a display member, alight reflection prevention layer and a watch.

FIG. 8 is a descriptive diagram schematically showing the relation of the positions between the display member, the light reflection prevention layer, and the watch.

As shown in FIG. 8, the display member 33 includes the liquid crystal display 331, and the upper light polarizing plate 332 and the lower light polarizing plate 333. The upper light polarizing plate 332 and the lower light polarizing plate 333 are positioned above and below (front and back of the display apparatus 3) the liquid crystal display 331 so as to sandwich the liquid crystal display 331. Among the above, the upper light polarizing plate 332 is the light polarizing plate on the viewing side (output side of light). The upper light polarizing plate 332 and the lower light polarizing plate 333 are positioned so that a direction of the transmittance axis which transmits light is shifted 90 degrees.

Although detailed illustration is omitted, the liquid crystal display 331 is a structure in which two glass substrates with transparent electrodes sandwich a liquid crystal layer including a liquid crystal molecule Lm. Alignment films (an alignment film 331*a* positioned on the upper light polarizing plate 332 side and an alignment film 331*b* positioned on the lower light polarizing plate 333 side) including thin grooves are provided on the glass substrate. A backlight which is not shown is positioned on a far side (lower side/back side in the display apparatus 3) than the lower light polarizing plate 333.

The liquid crystal molecule Lm has a characteristic to align along the grooves of the alignment films 331*a* and 331*b*. When the directions of the groove of the alignment films 331*a* and 331*b* are shifted 90 degrees, the liquid crystal molecules Lm are twisted between the alignment films 331*a* and 331*b* (state shown in FIG. 8). The vibration direction of the light passing the liquid crystal display 331 in such state is twisted 90 degrees along the twist of the liquid crystal molecules Lm.

On the other hand, the liquid crystal molecules Lm change the direction along the direction of the electric field when voltage is applied between the transparent electrodes. Therefore, the liquid crystal molecule Lm is not twisted, and the vibration direction of the light passing the liquid crystal display 331 in this state does not change.

By placing the liquid crystal display 331 between the upper light polarizing plate 332 and the lower light polarizing plate 333, the switching between the ON and OFF (visible/not visible) of the liquid crystal display 331 can be performed.

That is, the light emitted from the backlight ("light of backlight" shown in FIG. 8) is a mixture of light vibrating in various directions such as the vertical direction and horizontal direction.

For example, as shown in the illustrated example, when the lower light polarizing plate 333 is positioned so that the transmittance axis direction is the horizontal direction, only the light which vibrates in the horizontal direction among the light of the backlight is transmitted through the lower light polarizing plate 333. The light transmitted through the lower light polarizing plate 333 vibrates along the direction of the liquid crystal molecule Lm. For example, as shown in FIG. 8, when the direction of the groove in the alignment film 331*b* on the lower light polarizing plate 333 side is a horizontal direction and the direction of the groove in the alignment film 331*a* on the upper light polarizing plate 332 side is a vertical direction, the liquid crystal molecule Lm is twisted from the horizontal direction to the vertical direction, and the light which is transmitted through the lower light polarizing plate 333 and which enters the liquid crystal display 331 changes the vibration direction from the horizontal direction to the vertical direction.

The upper light polarizing plate 332 positioned on the output side is positioned so that the transmittance axis direction is shifted 90 degrees from the transmittance axis direction of the lower light polarizing plate 333 to be the vertical direction, and the light entering the liquid crystal display 331 can be transmitted through the upper light polarizing plate 332.

When the voltage is provided between the transparent electrodes, as described above, the liquid crystal molecule Lm is not twisted and the vibration direction of light does not change. When the transmittance axis direction of the lower light polarizing plate 333 is a horizontal direction, the vibration direction of light remains to be the horizontal direction. Therefore, the light which enters the liquid crystal display 331 cannot be transmitted through the upper light polarizing plate 332.

According to the present embodiment, when the display apparatus 3 is applied to the watch 100, it is preferable to position the display apparatus 3 so that the visibility is in the best state when the watch 100 is used normally worn by the user on the arm. Specifically, preferably, the direction in which the visibility of the display apparatus 3 becomes the best state matches with the 12 o'clock-6 o'clock axis in the analog watch.

Therefore, as shown in FIG. 8, the display apparatus 3 is positioned in the watch case 1 so that the transmittance axis of the upper light polarizing plate 332 positioned on the output side of the light becomes the vertical direction along the axis of the 12 o'clock-6 o'clock direction in the analog watch.

In this state, preferably, the light reflection prevention layers 35 and 36 are positioned so that the direction ("D-direction" in FIG. 8) in which the light transmittance rate becomes maximum viewed from the viewing side in the base materials 351 and 361 including the high phase difference film matches with the axis in the 12 o'clock-6 o'clock direction in the analog watch.

Although illustration is omitted, since the transmittance axis of light in light polarizing sunglasses is normally set to be in the vertical direction, by matching the transmittance axis of the upper light polarizing plate 332 of the display apparatus 3 with the axis in the 12 o'clock-6 o'clock direction in the analog watch, and by positioning the light reflection prevention layers 35 and 36 so that the direction (D-direction in FIG. 8) in which the light transmittance rate becomes maximum viewed from the viewing side in the base materials 351 and 361 matches with the axis in the 12 o'clock-6 o'clock direction, the visibility can be set to be good when the user views the display apparatus 3 (display region VAr of the display apparatus 3) with the user wearing the light polarizing sunglasses.

When the moth eye structures 352 and 362 to prevent reflection are provided, for example, when the display region VAr is viewed with the light polarizing sunglasses on, the display may become completely dark (so-called black out). For example, it can be expected that the user views the display region VAr of the display apparatus 3 with the light polarizing sunglasses on, and this obviously occurs when the watch 100 is a watch for sports in which there are many occasions that the watch is viewed with the light polarizing sunglasses on. Therefore, there is a demand that high visibility is maintained even when viewed through light polarizing sunglasses. Regarding this point, when the high phase difference film is used as the base materials 351 and 361 provided with the moth eye structures 352 and 362, the refraction and diffusion of light occurs. With this, the light in the transmittance axis direction of the upper light polarizing plate 332 positioned on the output side of the light is diffused and it is possible to suppress the display from becoming completely dark.

In the high phase difference film, as described above, there is a slow axis and a fast axis generated due to the manufacturing process, and the degree of refraction of light changes depending on how the high phase difference film is positioned. Therefore, when the light reflection prevention layers 35 and 36 include base materials 351 and 361 including the high phase difference film, preferably, the light reflection prevention layers 35 and 36 are positioned so that the direction (D-direction in FIG. 8) in which the light transmittance rate becomes maximum viewed from the viewing side in the base materials 351 and 361 matches with the axis of the 12 o'clock-6 o'clock direction in the analog watch.

For example, the light reflection prevention layers 35 and 36 according to the present embodiment includes a straight light polarizing film, and the straight light polarizing film is positioned so that the transmittance axis of the straight light polarizing film is aligned with the axis in the 12 o'clock-6 o'clock direction in the analog watch. The direction of the transmittance axis of the straight light polarizing film is the direction D in which the light transmittance rate becomes maximum viewed from the viewing side in the high phase difference film. With this, as shown in FIG. 8, the transmittance axis of the upper polarizing light plate 332 on the viewing side of the display apparatus 3 and the transmittance axis of the straight polarizing light film of the light reflection prevention layers 35 and 36 both match with the axis of the 12 o'clock-6 o'clock direction in the analog watch.

By positioning the light reflection prevention layers 35 and 36 in this direction, the display apparatus 3 can be viewed with good visibility even through light polarizing sunglasses.

For example, when a plurality of light reflection prevention layers 35 and 36 are provided, the light reflection prevention layers 35 and 36 are positioned so that the direction of the late axis in the high phase difference film including the base materials 351 and 361 of the light reflection prevention layers 35 and 36 are aligned, and the direction D in which the light transmittance rate becomes maximum viewed from the viewing side of all of the plurality of films is aligned with the direction of the axis of the 12 o'clock-6 o'clock direction of the analog watch. Specifically, the light reflection prevention layers 35 and 36 are positioned so that the transmittance axes of the straight light polarizing films included in the light reflection prevention layers 35 and 36 are both aligned with the axis of the 12 o'clock-6 o'clock direction in the analog watch.

That is, according to the present embodiment, when the light reflection prevention layers 35 and 36 are respectively provided on the surface in the solar panel 32 in contact with the air layer 34 and the surface in the display member 33 in contact with the air layer 34, the light reflection prevention layers 35 and 35 are positioned so that the direction of the slow axis is aligned between the base material 351 of the light reflection prevention layer 35 positioned on the solar panel 32 side and the base material 361 of the light reflection prevention layer 36 positioned on the display member 33 side. That is, 12H of the base material 351 of the light reflection prevention layer 35 positioned on the solar panel 32 side faces 12H of the base material 361 of the light reflection prevention layer 36 positioned on the display member 33 side, 6H of the base material 351 of the light reflection prevention layer 35 positioned on the solar panel 32 side faces 6H of the base material 361 of the light reflection prevention layer 36 positioned on the display member 33 side, 3H of the base material 351 of the light reflection prevention layer 35 positioned on the solar panel 32 side faces 3H of the base material 361 of the light reflection prevention layer 36 positioned on the display member 33 side, and 9H of the base material 351 of the light reflection prevention layer 35 positioned on the solar panel 32 side faces 9H of the base material 361 of the light reflection prevention layer 36 positioned on the display member 33 side. By aligning the directions of the base materials 351 and 361, the visibility of the display apparatus 3 can be enhanced effectively.

When the display apparatus 3 and the watch 100 including such display apparatus 3 is used, as described above, normally, the user views the display with the watch 100 worn on the wrist. In this case, preferably, the display apparatus 3 is positioned in the watch case 1 so that the axis in the 12 o'clock-6 o'clock direction (vertical direction shown in FIG. 1) in the analog watch is aligned with the direction D in which the light transmittance rate becomes maximum when viewed from the viewing side in the high phase difference film used in the base materials 351 and 361 in the light reflection prevention layers 35 and 36.

According to such positioning, the visibility is most effectively improved even in a state of normal use.

FIG. 7B shows the position of 9 o'clock and the position of 3 o'clock in the 9 o'clock-3 o'clock direction in the analog watch being inverted from the positions shown in FIG. 7A. This is because the light reflection prevention layer 35 positioned on the solar panel 32 side is attached to the solar panel 32 facing the light reflection prevention layer 36 positioned in the display member 33 side with the front and back inverted. Therefore, the position of 9 o'clock and the position of 3 o'clock are inverted.

Next, the display apparatus and the operation of the watch including such display apparatus according to the present embodiment is described.

When the display apparatus 3 according to the present embodiment is assembled, the solar panel 32 which is structured to be a light transmittance type is positioned on the back side of the windshield member 31 provided with a decorated portion 311 on the outer circumference portion. The adhesive layer 312 is provided in between.

For example, the positioning of the windshield member 31 and the solar panel 32 is performed by attaching a mark, etc. on each of the windshield member 31 and the solar panel 32 and matching the mark, etc.

The light reflection prevention layer 35 is positioned on the back side of the solar panel 32.

The light reflection prevention layer 35 is formed by the following process. A roll of the base material sheet 37 which is a high phase difference film in which the moth eye structure 352 is formed on the surface in advance is formed. The die 38 is set in the roll of the base material sheet 37 so that the direction D in which the light transmittance rate becomes maximum when viewed from the viewing side in the high phase difference film (for example, the direction of the transmittance axis of the straight light polarizing film included in the high phase difference film or the direction of the axis of the MD direction) matches with the axis in the 12 o'clock-6 o'clock direction in the analog watch. With this, the predetermined shape and the size is cut out to form the light reflection prevention layer 35.

When the moth eye structure 352 is formed on the base material 351, it is preferable to match the arrangement pattern of the small projections 353 in the moth eye structure 352 to the direction D in which the light transmittance rate becomes maximum viewed from the viewing side in the high phase difference film.

The light reflection prevention layer 35 is attached with the adhesive layer, etc. (not shown) so that the base material 351 side is to be on the back surface side of the solar panel 32.

Here, the light reflection prevention layer 35 is attached to be in the direction so that the axis of the 12 o'clock-6 o'clock direction in the analog watch for the display apparatus 3 and the watch 100 including the display apparatus 3 matches with the direction D in which the light transmittance rate becomes maximum when viewed from the viewing side in the high phase difference film which is the base material 351 included in the light reflection prevention layer 35.

When the light reflection prevention layer 35 is attached to the solar panel 32 side, bubbles tend to occur at the edge of the bumps on the surface of the power generator 322 of the solar panel 32. Therefore, preferably, the adhesive layer is provided to be a little thick to prevent the generating of the bubbles.

The light reflection prevention layer 36 is positioned on the surface (upper side surface) of the upper light polarizing plate 332 of the display member 33.

Similar to the light reflection prevention layer 35, the light reflection prevention layer 36 is formed by the following process. A roll of the base material sheet 37 which is a high phase difference film in which the moth eye structure 362 is formed on the surface in advance is formed. The die 39 is set in the roll of the base material sheet 37 so that the direction D in which the light transmittance rate becomes maximum when viewed from the viewing side in the high phase difference film (for example, direction of the transmittance axis of the straight light polarizing film included in the high phase difference film or the direction of the axis of the MD direction) matches with the axis in the 12 o'clock-6 o'clock direction in the analog watch. With this, the base material is cut out in the predetermined shape and size to form the light reflection prevention layer 36. As shown in FIG. 7B, the 9 o'clock position and the 3 o'clock position are on the opposite side from the light reflection prevention layer 35 positioned on the solar panel 32 side.

When the moth eye structure 362 is formed on the base material 361, it is preferable to match the arrangement pattern of the small projections 353 in the moth eye structure 362 to the direction D in which the light transmittance rate becomes maximum viewed from the viewing side in the high phase difference film.

The light reflection prevention layer 36 is attached with the adhesive layer, etc. (not shown) so that the base material 361 side is to be the front surface side of the upper light polarizing plate 332.

Here, the light reflection prevention layer 36 is attached to match the direction so that the axis of the 12 o'clock-6 o'clock direction in the analog watch for the display apparatus 3 and the watch 100 including the display apparatus 3 matches with the direction D in which the light transmittance rate becomes maximum when viewed from the viewing side in the high phase difference film which is the base material 361 included in the light reflection prevention layer 36 (for example, transmittance axis direction of the straight light polarizing film included in the high phase difference film).

When the light reflection prevention layer 36 is attached to the surface, bubbles tend to occur at the edge of the bumps on the surface of the power generator 322 of the solar panel 32. Therefore, preferably, the adhesive layer is provided to be a little thick to prevent the generating of the bubbles.

The light reflection prevention layer 36 is attached with the adhesive layer, etc. (not shown) so that the base material 361 side is to be the front side of the upper polarizing light plate 332.

Here, the light reflection prevention layer 36 is attached to match the direction so that the axis of the 12 o'clock-6 o'clock direction in the analog watch for the display apparatus 3 and the watch 100 including the display apparatus 3 matches with the direction D in which the light transmittance rate becomes maximum when viewed from the viewing side in the high phase difference film which is the base material 361 including the light reflection prevention layer 36.

When the light reflection prevention layer 36 is attached to the surface of the upper light polarizing plate 332 of the display member 33, since there are no bumps on the attaching surface, it is possible to make the adhesive layer thinner than when the light reflection prevention layer 35 is attached to the solar panel 32 side.

Moreover, the light reflection prevention layer 36 can be attached to the surface of the upper light polarizing plate 332 in advance, and the upper light polarizing plate 332 and the light reflection prevention layer 36 can be cut (that is, cut out with the die 39) with the two layers together. When manufactured in this way, it is not necessary to consider shift in tolerance at the time of adhering, and this is preferable.

Further, the display member 33 is positioned below the solar panel 32 so that the light reflection prevention layer 35 and the light reflection prevention layer 36 face each other. Here, a space as the air layer 34 is provided between the solar panel 32 and the display member 33.

When the display member 33 is positioned below the solar panel 32, positioning is performed to match the direction D in which the light transmittance rate becomes maximum viewed from the viewing side in the high phase difference film which is the base material 351 of the light reflection prevention layer 35 on the solar panel 32 side (for example, transmittance axis direction of the straight light polarizing film included in the high phase difference film) and the direction D in which the light transmittance rate becomes maximum viewed from the viewing side in the high phase difference film which is the base material 361 of the light reflection prevention layer 36 on the display member 33 side (for example, transmittance axis direction of the straight light polarizing film included in the high phase difference film).

With this, the assembling of the display apparatus 3 is completed. Then, the assembled display apparatus 3 is stored in the watch case 1.

Here, the axis of the 12 o'clock-6 o'clock direction in the analog watch which is the watch 100 and the axis of the 12 o'clock-6 o'clock direction in the display of the display apparatus 3 (axis in the vertical direction as the display of the watch) are matched, and the display apparatus 3 is set in the watch case 1. With this, the direction D in which the light transmittance rate becomes maximum when viewed from the viewing side in the high phase difference film which is the base materials 351 and 361 of the light reflection prevention layers 35 and 36 positioned in the display apparatus 3 (for example, the transmittance axis direction of the straight light polarizing film included in the high phase difference film) is matched with the axis of the 12 o'clock-6 o'clock direction in the analog watch which is the watch 100.

With this, the assembly of the watch 100 ends.

As described above, by providing the light reflection prevention layer 35 and the light reflection prevention layer 36 in the display apparatus 3, even if there is an air layer 34 between the solar panel 32 and the display member 33, the light reflection can be suppressed and the visibility of the display apparatus 3 and the watch 100 including the display apparatus 3 can be enhanced.

The direction D in which the light transmittance rate becomes maximum viewed from the viewing side in the high phase difference film which is the base materials 351 and 361 of the light reflection prevention layers 35 and 36 positioned in the display apparatus 3 (for example, transmittance axis direction of the straight light polarizing film included in the high phase difference film) is matched with the 12 o'clock-6 o'clock axis in the analog watch which is the watch 100. With this, in the normal use in which the watch 100 is worn on the arm, the visibility of the display apparatus 3 and the watch 100 can be in the best state.

As described above, according to the present embodiment, the windshield member 31 formed with the material which transmits light, the solar panel 32 positioned to be in contact with the bottom portion of the windshield member 31, the display member 33 which is provided below the solar panel 32 and which includes the display region VAr which can be viewed from outside, the air layer 34 positioned between the solar panel 32 and the display member 33, and the light reflection prevention layers 35 and 36 provided on the surface in contact with the air layer 34 in the solar panel 32 and on the surface in contact with the air layer 34 in the display member 33 are layered in the viewing direction Vd viewing the display member 33 through the windshield member 31 and the solar panel 32. The region of the windshield member 31 overlapped with the display region Var of the display member 33 functions as the window for waterproof inspection.

With this, it is possible to confirm whether fogging due to condensation occurs in the center in the surface direction of the display apparatus 3 corresponding to the display region VAr. Since the condensation tends to occur in the center of the display apparatus 3, it is possible to perform the waterproof inspection with high reliability.

The air layer 34 is provided in such position in the region which is overlapped with the display region VAr of the display member 33 to perform the waterproof inspection in this position. The light reflection prevention layers 35 and 36 are provided on the surface in contact with the air layer 34 in the solar panel 32 and the surface in contact with the air layer 34 in the display member 33 which are the surfaces where light tends to be reflected due to the difference in the refraction index. Therefore, the reflection of light is suppressed. With this, the reflection of the user, etc. in the liquid crystal display 331 can be reduced and the good visibility in the display region VAr of the liquid crystal display 331 can be secured.

The fogging due to the condensation when the waterproof properties are not sufficient clearly occurs near the center of the display apparatus. Therefore, it is clearer and more reliable to confirm the fogging near the center portion overlapping with the display region of the display member rather than the circumferential edge portion of the protecting member.

In order to confirm whether there is fogging due to the condensation in the air layer provided in the circumferential edge portion of the protecting member, it is necessary to provide a window for confirmation in the corresponding portion, and the design of the display apparatus and the device such as the watch including the display apparatus becomes limited.

Further, when the solar panel is provided, there is a demand to position the solar panel largely to the portion corresponding to the circumferential edge portion of the protecting member and the freedom of positioning the solar panel is limited when the waterproof inspection is performed using the circumferential edge portion of the protecting member.

When the configuration according to the present embodiment is employed, it is possible to confirm the waterproof properties by the waterproof inspection in the region corresponding to the display region, and it is also possible to achieve high visibility.

If the light transmittance rate becomes high, the screen of the liquid crystal display 331 becomes bright, and it is possible to achieve the display which is clear and easy to view. Further, the contrast of the color in the liquid crystal display 331 improves. Therefore, when the color display is possible, the display can be performed vividly, reliably reproducing the original color. When the display with a large amount of black portions such as a display of the black background is performed on the liquid crystal display 331, the black color becomes clearly blacker, and the appearance of the display apparatus 3 improves.

According to the present embodiment, the light reflection prevention layers 35 and 36 are respectively positioned in the surface in which the solar panel 32 (plate-shaped light transmitting member) is in contact with the air layer 34 and the surface in which the display member 33 is in contact with the air layer 34.

By providing the light reflection prevention layers 35 and 36 in the surface which comes into contact with the air layer 34, even if the air layer 34 is provided, it is possible to effectively suppress the reflection of light and the display apparatus 3 with good visibility can be achieved.

According to the present embodiment, the outer circumference power generating region PAr through which light is hardly transmitted is provided in the solar panel 32 as the viewing regulating portion to regulate viewing so that the region other than the display region VAr in the display member 33 cannot be viewed from outside.

With this, the various wiring and the positioning portions positioned in the region other than the display region VAr are masked, and the appearance of the display apparatus 3 can be made to be good.

When the region other than the display region VAr is masked as described above, it is not possible to provide a window for waterproof inspection while avoiding the display region VAr. In this case also, according to the configuration of the present embodiment, the fogging due to condensation can be confirmed in the region of the windshield member 31 overlapped with the display region VAr, and the waterproof inspection with high reliability can be performed.

The viewing regulating portion according to the present embodiment is a shielding processed portion positioned in the layering direction (viewing direction Vd) toward the viewing side than the display member 33. Specifically, the viewing regulating portion is the outer circumference power generating region PAr in the solar panel 32.

Therefore, the appearance of the display apparatus 3 can be effectively made to be good because a different member is not provided as the viewing regulating portion.

The plate shaped light transmitting member according to the present embodiment is the solar panel 32.

By providing the solar panel 32 which transmits light, the visibility of the display of the display member 33 can be secured while securing power by the photovoltaic charging.

When the plate shaped light transmitting member is the solar panel 32 as in the present embodiment, by providing a power generating region (outer circumference power generating region PAr) in the portion of the solar panel 32 other than the region overlapped with the display region VAr of the display member 33, the power can be generated with the light entering from the viewing direction without interfering with the visibility of the display region VAr.

When the plate shaped light transmitting member as described in the present embodiment is the solar panel 32, when the power generating region (translucent power generating region SAr) is included in at least the region of the solar panel 32 overlapped with the display region VAr of the display member 33, the light entering from the viewing direction can be received in the region corresponding to the display region VAr, and the power can be generated efficiently. According to the present embodiment, the outer circumference power generating region PAr is provided in the portion other than the region which is overlapped with the display region VAr. Therefore, it is possible to generate power more effectively, and more power can be obtained.

The light reflection prevention layers 35 and 36 according to the present embodiment include the moth eye structures 352 and 362 in which a plurality of small projections are positioned like a forest.

Therefore, it is possible to effectively suppress reflection of light entering in the display region VAr of the display member 33. With this, the light transmittance rate is improved, the screen of the liquid crystal display 331 becomes bright, and the display region VAr becomes clear and easy to see. Further, the contrast of the color in the liquid crystal display 331 is improved, and the display can be performed vividly, reliably reproducing the original color. When the display with a large amount of black portions is performed such as the display of the black background on the liquid crystal display 331, it is possible to achieve the display region VAr in which the black color can be clearly shown to be blacker and in which the appearance is excellent.

When a plurality of light reflection prevention layers 35 and 36 are provided according to the present embodiment, the layers are positioned so that the arrangement pattern of the small projections 353 are aligned in the moth eye structures 352 and 362 in the light reflection prevention layers 35 and 36.

According to such positioning, the concave-convex shape continues evenly in the moth eye structures 352 and 362, and the reflection of light can be effectively suppressed.

According to the present embodiment, the high phase difference film is applied as the base materials 351 and 361 provided with the moth eye structures 352 and 362.

When the moth eye structures 352 and 362 are provided to prevent reflection, for example, when the display region VAr is viewed with the light polarizing sunglasses on, the display may become completely black depending on the viewed angle. When the high phase difference film is used as the base materials 351 and 361 provided in the moth eye structures 352 and 362, the light in the transmittance axis direction of the upper light polarizing plate 332 positioned on the output side of the light is dispersed due to the refraction and the dispersion of light occurring, and the display region VAr appearing to be completely black can be suppressed.

According to the present embodiment, when a plurality of light reflection prevention layers 35 and 36 are provided, the layers are positioned so that the directions of the slow axes of the high phase difference films as the base materials 351 and 361 in the light reflection prevention layers are aligned.

The high phase difference film includes a slow axis and a fast axis generated in the manufacturing process. The way the high phase difference film appears changes depending on the direction that the film is positioned. By aligning the directions of the slow axes of the high phase difference films as the base materials 351 and 361 in the light reflection prevention layers 35 and 36, the characteristics regarding the view of the plurality of light reflection prevention layers 35 and 36 can be made uniform. The plurality of light reflection prevention layers 35 and 36 can be easily positioned in an effective direction.

That is, by aligning the direction of the high phase difference films included in the plurality of light reflection prevention layers 35 and 36, the directions D in which the light transmittance rate becomes maximum viewed from the viewing side in the base materials 351 and 361 including the high phase difference film are aligned. By aligning the above with the transmittance axis direction of the upper light polarizing plate 332 positioned on the output side of the light in the display member 33, the display apparatus 3 with excellent visibility can be achieved.

When the display apparatus 3 with the above structure is included in the watch case 1, and the display apparatus 3 is applied to the watch 100, it is possible to confirm whether the fogging due to condensation occurs in the center of the display region VAr of the watch 100. Therefore, it is possible to perform waterproof inspection with high reliability.

Even when the air layer 34 to perform the waterproof inspection is provided, it is possible to suppress the reflection of light occurring in the boundary with the air layer 34 by the light reflection prevention layers 35 and 36. Therefore, it is possible to reduce the reflection of the user, etc. in the liquid crystal display 331, and the watch can be made so that the display region VAr of the liquid crystal display 331 is easy to view.

Since the light transmittance rate is high, the screen of the liquid crystal display 331 becomes bright, and the display of the watch 100 is easy to see. Further, if the liquid crystal display 331 can be displayed in color, the contrast becomes good. Therefore, the watch can be made so that the display is performed vividly, reliably reproducing the original color. When the display with the large amount of the black portion such as the display of the black background is performed on the liquid crystal display 331, the black color can be shown to be more clearly blacker, and the appearance of the watch 100 is improved.

According to the present embodiment, when the light reflection prevention layers 35 and 36 of the display apparatus 3 includes the moth eye structures 352 and 362, the display apparatus 3 is positioned in the watch case 1 so that the axis of the 12 o'clock-6 o'clock direction in the analog watch and the arrangement of the small projections 353 in the moth eye structures 352 and 362 are aligned when the display apparatus 3 is stored in the watch case 1 of the watch 100.

Therefore, when the display region VAr is viewed in the normal direction when the watch 100 is worn on the arm, the reflection of light can be suppressed effectively and high visibility can be maintained.

According to the present embodiment, when the light reflection prevention layers 35 and 36 of the display apparatus 3 include the base materials 351 and 361 including the high phase difference film, the display apparatus 3 is positioned in the watch case 1 so that the axis of the 12 o'clock-6 o'clock direction in the analog watch is aligned with the direction D in which the light transmittance rate becomes maximum viewed from the viewing side in the high phase difference film in the light reflection prevention layers 35 and 36 (for example, transmittance axis direction of the straight light polarizing film included in the high phase difference film) when the display apparatus 3 is stored in the watch case 1 of the watch 100.

As described above, when the display apparatus 3 is positioned in the watch case 1 so that the arrangement of the small projections 353 in the moth eye structures 352 and 362 is aligned with axis of the 12 o'clock-6 o'clock direction in the analog watch, the arrangement of the small projections 353, the direction D in which the light transmittance rate becomes maximum viewed from the viewing side in the high phase difference film, and the axis of the 12 o'clock-6 o'clock direction in the analog watch are all aligned. Therefore, higher visibility can be expected.

The high phase difference film includes a characteristic in which the appearance changes depending on the direction of the positioning. When the display apparatus 3 is included in the watch 100, the user normally views the display of the liquid crystal display 331 in a state worn on the wrist. Therefore, by matching the direction D in which the light transmittance rate becomes maximum viewed from the viewing side in the high phase difference film in the light reflection prevention layers 35 and 36 and the axis of the 12 o'clock-6 o'clock direction in the analog watch, it is possible to achieve the watch which can perform the most vivid display when the display region VAr is viewed in the normal direction when the watch 100 is worn on the arm.

Since the display of the high phase difference film viewed from the direction other than the direction D in which the light transmittance rate becomes maximum viewed from the viewing side becomes dark, the displayed contents become difficult to see when other people try to look into the display region VAr. Therefore, it is possible to expect the effect of protecting privacy.

The embodiments according to the present invention are described above, but the present invention is not limited to the above-described embodiments, and various modifications are possible without leaving the scope of the present invention.

For example, the position where the air layer is provided is not limited to the example shown in the above embodiments.

Figure 9:
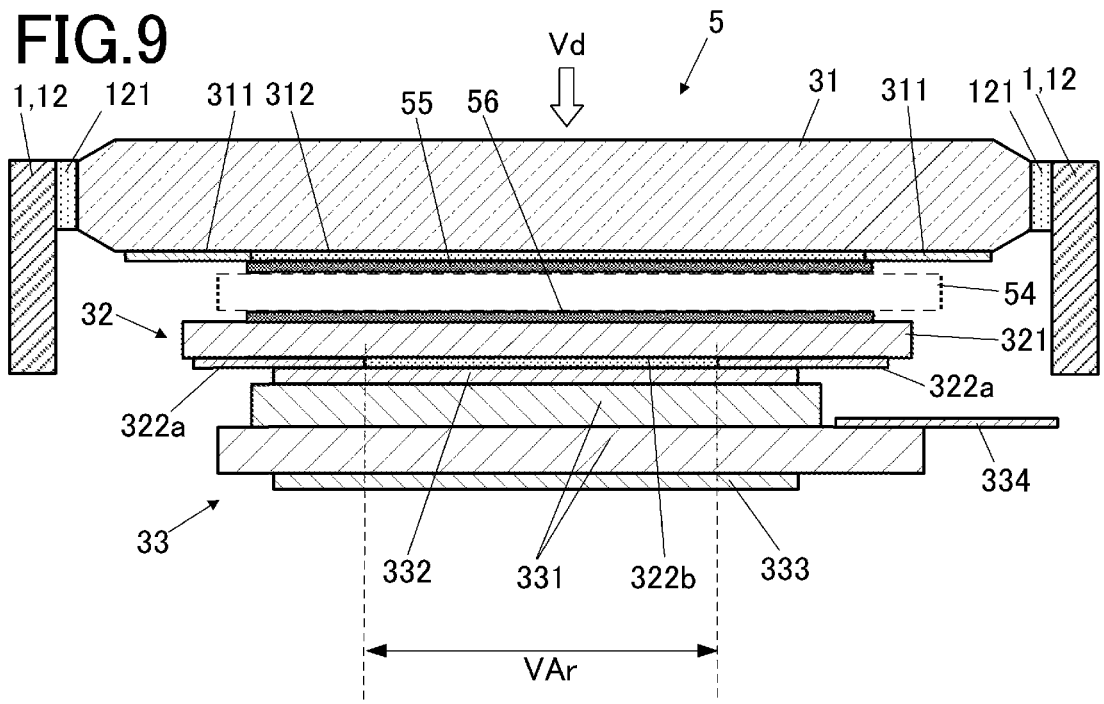
FIG. 9 is a schematic cross-sectional diagram showing a modification of a display apparatus according to the present embodiment.

FIG. 9 is a schematic cross-sectional diagram showing an example of a display apparatus which is different from the position in which the air layer is provided.

FIG. 9 shows an example in which the air layer 54 is positioned between the windshield member 31 which is a protecting member formed with a material which transmits light and the solar panel 32 which is a plate shaped light transmitting member. The same reference numerals are applied to the portions which are the same as the above embodiment and the description is omitted.

When the air layer 54 is provided between the windshield member 31 and the solar panel 32, the solar panel 32 is positioned below the windshield member 31 with a space in between, and the display member 33 including the display region VAr which can be viewed from outside is provided below the solar panel 32 without providing a layer of air, that is, without providing a space.

Then, the light reflection prevention layers 55 and 56 are respectively provided in the surface in contact with the air layer 54 in the windshield member 31 and the surface in contact with the air layer 54 in the solar panel 32.

In this case also, the region in the windshield member 31 overlapped with the display region VAr of the display member 33 functions as the window for waterproof inspection.

With this, it is possible to confirm whether fogging occurs due to the condensation in the center in the surface direction of the display apparatus 3 corresponding to the display region VAr. The condensation tends to occur in the center of the display apparatus 3, and the waterproof inspection with high reliability can be performed.

When the air layer 34 is provided in the region overlapped with the display region VAr of the display member 33 to perform the waterproof inspection in such position, the light reflection prevention layers 55 and 56 are provided in the surface in contact with the air layer 54 in the windshield member 31 and the surface in contact with the air layer 54 in the solar panel 32 which are the surfaces which easily reflect light due to the difference in the refraction rate of light. With this, it is possible to effectively suppress the reflection of light.

Therefore, the reflection of the user, etc. in the liquid crystal display 331 can be reduced, and the good visibility in the display region VAr of the liquid crystal display 331 can be secured.

Since the light transmittance rate becomes high, the screen of the liquid crystal display 331 becomes bright, and the display which is clear and easy to view can be obtained.

Further, since the contrast of the color of the liquid crystal display 331 becomes better, when the color display is possible, the display can be performed vividly, reliably reproducing the original color. Further, when the display with a large amount of black portions such as the display of the black background in the liquid crystal display 331 is performed, the black color becomes clearly blacker, and the appearance of the display apparatus 3 and the watch 100 including the display apparatus 3 is improved.

Further, in this case, the light reflection prevention layer 56 is provided in the surface in contact with the air layer 54 in the solar panel 32, and the reflection of light occurring between the solar panel 32 and the air layer 54 can be suppressed. With this, the light transmittance rate is enhanced, and it is expected that the power generating efficiency in the solar panel 32 is enhanced.

Figure 10A:
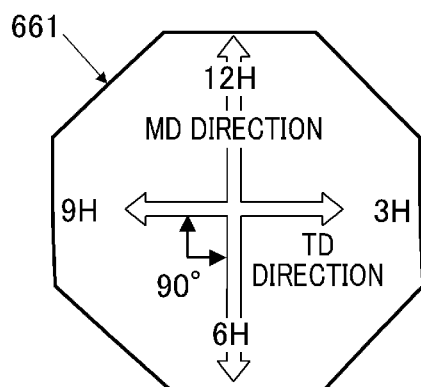
FIG. 10A is a schematic diagram showing a base material included in the light reflection prevention layer positioned on the liquid crystal display side according to a modification of the present embodiment.
Figure 10B:
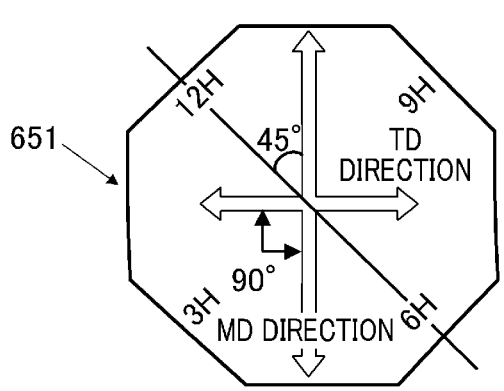
FIG. 10B is a schematic diagram showing a base material included in the light reflection prevention layer positioned on the solar panel side according to a modification of the present embodiment.

If a first light reflection prevention layer (for example, light reflection prevention layer 36 in FIG. 2) and a second light reflection prevention layer (for example, light reflection prevention layer 35 in FIG. 2) are provided on each side of the air layer 34 as the light reflection prevention layers, as shown in FIG. 10A and FIG. 10B, the light reflection prevention layers (for example, the light reflection prevention layers 35 and 36 as shown in FIG. 2) can be positioned so that the direction of the high phase difference film used as a base material 661 in the first light reflection prevention layer (for example, light reflection prevention layer 36 in FIG. 2) is shifted from the direction of the high phase difference film used as a base material 651 in the second light reflection prevention layer (for example, light reflection prevention layer 35 in FIG. 2) by 45 degrees. When the above directions are shifted 45 degrees, the directions of the high phase difference film as the base material 661 in the first light reflection prevention layer and the high phase difference film as the base material 651 in the second light reflection prevention layer are shifted in the same direction.

In this case, the light reflection prevention layers may be positioned with the direction of the high phase difference film shifted so that the oriented angle is 45 degrees between the direction D in which the transmittance rate becomes maximum viewed from the viewing side in the high phase difference film used as the base material 661 in the first light reflection prevention layer (for example, light reflection prevention layer 36 in FIG. 2) and the direction D in which the transmittance rate is maximum viewed from the viewing side in the high phase difference film used as the base material 651 in the second light reflection prevention layer (for example, light reflection prevention layer 35 in FIG. 2).

When the first light reflection prevention layer and the second light reflection prevention layer are provided, one is positioned so that the direction D in which the light transmittance rate becomes maximum viewed from the viewing side in the high phase difference film included in the light reflection prevention layer is matched with the 12 o'clock-6 o'clock direction in the analog watch, and the other is positioned so that the direction D in which the light transmittance rate becomes maximum viewed from the viewing side in the high phase difference film included in the light reflection prevention layer is shifted 45 degrees from the direction of the direction D in the one light reflection prevention layer.

When the light reflection prevention layers are positioned with the axes shifted, the straight polarizing light output from the upper polarizing light plate 332 (straight polarizing light in the vertical direction as shown in FIG. 8) is converted to the state close to natural light (state close to circular polarization). With this, when the display region VAr of the display apparatus 3 is viewed from the horizontal direction (3 o'clock-9 o'clock of the analog watch) through the light polarizing sunglasses in which the transmittance axis is set in the vertical direction, although there is loss in light transmitting through the transmittance axis of the light polarizing sunglasses, there is light which can be transmitted through the transmittance axis. Therefore, it is possible to avoid the state in which it is not possible to see anything.

Various structures can be employed as the structure in which a plurality of light reflection prevention layers are provided.

For example, the first light reflection prevention layer (light reflection prevention layer 36) provided on the surface in which the solar panel 32 which is the plate shaped light transmittance member is in contact with the air layer 34 may include at least a straight light polarizing film, and the second light reflection prevention layer (for example, light reflection prevention layer 35 in FIG. 2) provided in the surface in which the display member 33 is in contact with the air layer 34 may include at least a λ/4 phase difference film. In this case, the light reflection prevention layers may be positioned with the direction of the high phase difference film shifted so that the late axis in the surface of the λ/4 phase difference film in the light reflection prevention layer 35 is a direction at 45 degrees with relation to the transmittance axis of the straight polarizing light film in the light reflection prevention layer 36.

In this case, the light reflection prevention layer including the straight light polarizing film (first light reflection prevention layer according to the present embodiment) is positioned so that the transmittance axis direction of the straight light polarizing film matches with the direction of 12 o'clock-6 o'clock in the analog watch, and the other light reflection prevention layer (second light reflection prevention layer according to the present embodiment) is positioned with the direction of the high phase difference film shifted so that the late axis in the surface of the λ/4 phase difference film included in the second light reflection prevention layer is the direction at 45 degrees with relation to the transmittance axis of the straight light polarizing film of the first light reflection prevention layer.

In this case also, the straight polarizing light output from the upper polarizing plate 332 (straight polarizing light in the vertical direction in FIG. 8) is converted to the state close to the natural light (state close to circular polarization). That is, according to the above example, when the direction D of the high phase difference film which is the base material 661 (direction of the transmittance axis of the straight light polarizing film included in the high phase difference film) and the direction D of the high phase difference film which is the base material 651 (direction of the late axis in the surface of the λ/4 phase difference film included in the high phase difference film) are tilted about 45 degrees, the straight polarizing light is divided into two light polarizing components which are orthogonal to each other and which have equal amplitude. A delay in the phase in one light polarizing component occurs and as a result, a shift in the random phase occurs, and the straight polarizing light is converted to circular polarizing light or substantial circular polarizing light. When tilted 45 degrees, the straight polarizing light becomes the circular polarizing light and before and after, the light becomes the elliptical polarizing light. If it is within the range allowed as the way of view, it is not limited to the circular polarizing light, and the elliptical polarizing light or the substantial circular polarizing light (shift in angle of direction D) may also be allowed.

By converting the straight polarizing light to a state close to the natural light (state close to circular polarizing light), when the display region VAr of the display apparatus 3 is viewed from the horizontal direction (3 o'clock-9 o'clock in the analog watch) through the light polarizing sunglasses in which the transmittance axis is set in the vertical direction, although there is loss in the light transmitting the transmittance axis of the light polarizing sunglasses, since there is light which can transmit the transmittance axis, it is possible to avoid the state in which it is not possible to see anything.

That is, although it is not possible to expect brightness the same as when the direction D in which the light transmittance rate becomes maximum when viewed from the viewing side in the high phase difference film which is the base material 661 of the first light reflection prevention layer and the direction D in which the light transmittance rate becomes maximum when viewed from the viewing side in the high phase difference film which is the base material 651 of the second reflection prevention layer are aligned on both surfaces of the air layer 34, the display region VAr does not become dark viewed from any angle, and the visibility can be secured.

When such display apparatus is included in the watch 100, it is possible to achieve the watch with the certain visibility secured regardless of the direction of wearing the watch 100.

The plate shaped light transmittance member is not limited to the solar panel 32.

For example, the display apparatus can be a display apparatus in which the plurality of display members are positioned overlapped, and in this case, the second display member (either one of the plurality of display members) can function as the plate shaped light transmittance member.

In this case also, by providing the light reflection prevention layer in the surface in contact with the air layer 34 in the second display member, it is possible to suppress the reflection of light and to secure the visibility of the display apparatus.

The viewing regulating portion is not limited to the shielding processed portion such as the outer circumference power generating region PAr of the solar panel 32.

For example, the viewing regulating portion can be a cover member such as a bezel member positioned outside the display apparatus 3 or the watch case 1.

In this case also, by masking the various wiring and the positioning portions positioned in the region other than the display region VAr, it is possible to finish the appearance of the display apparatus 3 to look good.

When the region other than the display region VAr is masked, although it is not possible to provide the window for waterproof inspection avoiding the display region VAr, according to the configuration shown in the above embodiment, it is possible to confirm whether fogging occurs due to condensation in the region of the windshield member 31 overlapped with the display region VAr. Therefore, it is possible to perform the waterproof inspection with high reliability.

According to the present embodiment, the light reflection prevention layers 35 and 36 are provided on both surfaces in contact with the air layer 34, but only one layer of the light reflection prevention layer may be provided.

In this case also, the reflection of light can be suppressed to a certain degree and the visibility can be secured.

The number of components can be reduced, the burden such as positioning the light reflection prevention layers 35 and (positioning the directions D in which the light transmittance rate becomes maximum when viewed from the viewing side) can be omitted, and the number of processes in assembly can be reduced. Therefore, the cost of the display apparatus 3 and the watch 100 including the display apparatus 3 can be suppressed.

According to the present embodiment, the high phase difference film is applied as the base materials 351 and 361 provided with the moth eye structures 352 and 362. However, the base materials 351 and 361 are not limited to the high phase difference film (phase difference film) and a simple transparent resin film can be used.

When the moth eye structures 352 and 362 are provided, when viewed without the light polarizing sunglasses, the effect to prevent reflection of the light occurring in the boundary with the air layer 34 can be sufficiently achieved without using the high phase difference film (phase difference film) and the visibility can be enhanced.

In this case also, when a plurality of the light reflection prevention layers are provided, preferably, the arrangement pattern of the small projections 353 in the moth eye structures 352 and 362 of the light reflection prevention layers 35 and 36 are aligned.

In the state in which the display apparatus 3 is stored in the watch case 1 of the watch 100, preferably, the display apparatus 3 is positioned in the watch case 1 so that the axis of the 12 o'clock-6 o'clock direction in the analog watch is aligned with the arrangement of the small projections 35 in the moth eye structures 352 and 362.

With this, when the display region VAr is viewed in the normal direction when the watch 100 is worn on the arm, the reflection of light can be suppressed effectively and high visibility can be maintained.

As shown in FIG. 7A and FIG. 7B, the light reflection prevention layers 35 and 36 are in a polygon shape (octagon in the diagram) but the shape of the light reflection prevention layers 35 and 36 is not limited to the above. For example, a polygon with many corners is possible and a rectangle is possible.

Positioning is easier when the light reflection prevention layers 35 and 36 are provided if the shape is a polygon. However, if a mark for positioning is attached, the shape of the light reflection prevention layers 35 and 36 can be a disk shape.

According to the present embodiment, the display apparatus 3 is included in the watch 100 but the device in which the display apparatus 3 is included is not limited to the watch 100.

The device can be any device in which the display apparatus 3 which performs various displays can be applied, for example, live body information display apparatuses such as a pedometer, heart rate monitor, or pulse rate monitor, electronic devices which display various information such as moved distance, moved pace information, altitude information, or barometric pressure information, or other devices.

Although various embodiments of the present invention are described, the scope of the present invention is not limited to the above-described embodiments, and the scope of the present invention includes the scope of the attached claims and its equivalents.

What is claimed is:

1. A display apparatus comprising:
    a protecting plate which is formed of a material which transmits light;
    a light transmitting plate which is positioned below the protecting plate and which is positioned in contact with the protecting plate;
    a display which is provided below the light transmitting plate and which includes a display region which can be viewed from outside;

an air layer which is positioned between the light transmitting plate and the display; and a light reflection prevention layer which is provided on at least one of a surface of the light transmitting plate facing the air layer and a surface of the display facing the air layer, wherein, the protecting plate, the light transmitting plate, the display, the air layer, and the light reflection prevention layer are layered in a thickness direction of the protecting plate, wherein the display region can be viewed from outside through the protecting plate, the light transmitting plate, the light reflection prevention layer, and the air layer, and a region in the protecting plate overlapped with the display region of the display includes a window with which waterproof inspection is performed.

2. A display apparatus comprising:

a protecting plate which is formed of a material which transmits light;

a light transmitting plate which is positioned below the protecting plate;

a display which is provided below the light transmitting plate, which is provided in contact with the light transmitting plate, and which includes a display region which can be viewed from outside;

an air layer which is positioned between the protecting plate and the light transmitting plate; and a light reflection prevention layer which is provided on at least one of a surface of the protecting plate facing the air layer and a surface of the light transmitting plate facing the air layer, wherein, the protecting plate, the light transmitting plate, the display, the air layer, and the light reflection prevention layer are layered in a thickness direction of the protecting plate, wherein the display region can be viewed from outside through the protecting plate, the light reflection prevention layer, the air layer, and the light transmitting plate, and a region in the protecting plate overlapped with the display region of the display includes a window with which waterproof inspection is performed.

3. The display apparatus according to claim 1, wherein the light reflection prevention layer is positioned on each of the surface of the light transmitting plate facing the air layer and the surface of the display facing the air layer.

4. The display apparatus according to claim 2, wherein the light reflection prevention layer is positioned on each of the surface of the protecting plate facing the air layer and the surface of the light transmitting plate facing the air layer.

5. The display apparatus according to claim 1, further comprising an external regulator which regulates a region other than the display region in the display in a manner in which the region cannot be viewed from outside.

6. The display apparatus according to claim 5, wherein the external regulator is a shielding processed portion positioned to a viewing side than a cover positioned externally or the display in a layering direction.

7. The display apparatus according to claim 1, wherein the light transmitting plate is a solar panel or a second display.

8. The display apparatus according to claim 1, wherein the light transmitting plate is a solar panel and a power generating region is included in a portion of the solar panel other than a region overlapped with the display region of the display.

9. The display apparatus according to claim 1, wherein the light transmitting plate is a light transmitting solar panel, and a power generating region is included in at least a region overlapped with the display region of the display in the solar panel.

10. The display apparatus according to claim 1, wherein the light reflection prevention layer includes a moth eye structure in which a plurality of small projections are provided like a forest.

11. The display apparatus according to claim 10, wherein when a plurality of light reflection prevention layers are provided, the light reflection prevention layers are positioned so that arrangement patterns of the small projections in the moth eye structure of the light reflection prevention layers are aligned.

12. The display apparatus according to claim 1, wherein the light reflection prevention layer includes a phase difference film.

13. The display apparatus according to claim 12, wherein when the plurality of light reflection prevention layers are provided, directions of late axes in the phase difference films in the light reflection prevention layers are aligned.

14. The display apparatus according to claim 12, wherein, a first light reflection prevention layer and a second light reflection prevention layer are included as the light reflection prevention layer, the first light reflection prevention layer includes at least a straight light polarizing film, and the second light reflection prevention layer includes at least a $\lambda/4$ phase difference film, wherein a late axis in a surface of the $\lambda/4$ phase difference film is positioned to be a direction which is 45 degrees with relation to a transmittance axis of the straight light polarizing film.

15. A watch comprising:

a display apparatus according to claim 1; and a case member which stores the display apparatus.

16. The watch according to claim 15, wherein, the display apparatus is stored in the case member in a manner in which a transmittance axis which transmits output light is matched with the axis in a 12 o'clock-6 o'clock direction in the watch, the light reflection prevention layer of the display apparatus includes a base material including a phase difference film, and the light reflection prevention layer is positioned in a manner in which a direction in which a light transmittance rate becomes maximum viewed from a viewing side in a base material including the phase difference film is aligned with the axis in the 12 o'clock-6 o'clock direction in the watch.

17. The watch according to claim 15, wherein, the display apparatus is stored in the case member in a manner in which a transmittance axis of a polarizing plate on a viewing side to transmit output light is matched with an axis in a 12 o'clock-6 o'clock direction in the watch, and the light reflection prevention layer includes at least a straight light polarizing film, and the light reflection prevention layer is positioned in a manner in which a transmittance axis of the straight light polarizing film is aligned with the axis in the 12 o'clock-6 o'clock direction in the watch.

18. The watch according to claim 15, wherein, the display apparatus is stored in the case member in a manner in which a transmittance axis which transmits output light is matched with an axis in a 12 o'clock-6 o'clock direction in the watch, the light reflection prevention layer of the display apparatus includes a base material including a phase difference film, and the light reflection prevention layer is positioned in a manner in which a direction in which the light transmittance rate becomes maximum viewed from a viewing side in the base material including the phase difference film is to be a direction 45 degrees with relation to the axis in the 12 o'clock-6 o'clock direction in the watch.

19. The watch according to claim 15, wherein, the display apparatus is stored in the case member in a manner in which a transmittance axis which transmits output light is matched with an axis in a 12 o'clock-6 o'clock direction in the watch, and the light reflection prevention layer of the display apparatus includes at least a λ/4 phase difference film, and the light reflection prevention layer is positioned in a manner in which a slow axis in a surface of the λ/4 phase difference film is to be a direction 45 degrees with relation to the axis in the 12 o'clock-6 o'clock direction in the watch.

20. The watch according to claim 15, wherein, the display apparatus is stored in the case member in a manner in which a transmittance axis of a light polarizing plate on a viewing side to transmit output light is matched with an axis in a 12 o'clock-6 o'clock direction in the watch, the first light reflection prevention layer is provided on a surface of the light transmitting plate facing the air layer and the second light reflection prevention layer is provided in a surface of the display facing the air layer, the first light reflection prevention layer includes at least a straight light polarizing film, and the first light reflection prevention layer is positioned in a manner in which the transmittance axis of the straight light polarizing film is aligned with the axis in the 12 o'clock-6 o'clock direction in the watch, and the second light reflection prevention layer includes at least a λ/4 phase difference film, and the second light reflection prevention layer is positioned in a manner in which a slow axis in the surface of the λ/4 phase difference film is to be a direction 45 degrees with relation to the axis in the 12 o'clock-6 o'clock direction in the watch.

* * * * *